United States Patent
Ozaki et al.

(10) Patent No.: US 11,916,808 B2
(45) Date of Patent: Feb. 27, 2024

(54) BASE WIRELESS DEVICE AND WIRELESS COMMUNICATION METHOD

(71) Applicant: SMC CORPORATION, Tokyo (JP)

(72) Inventors: Norimasa Ozaki, Moriya (JP); Toshiaki Kuwahara, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/661,655

(22) Filed: May 2, 2022

(65) Prior Publication Data
US 2022/0377023 A1    Nov. 24, 2022

(30) Foreign Application Priority Data

May 21, 2021   (JP) ................................ 2021-086143

(51) Int. Cl.
G06F 15/173     (2006.01)
H04L 47/80      (2022.01)
(Continued)

(52) U.S. Cl.
CPC ............ *H04L 47/806* (2013.01); *H04L 47/15* (2013.01); *H04W 28/0278* (2013.01); *H04W 76/15* (2018.02)

(58) Field of Classification Search
CPC ...... H04L 47/806; H04L 47/15; H04W 76/15; H04W 28/0278
(Continued)

(56) References Cited

U.S. PATENT DOCUMENTS 6,515,982 B1 *  2/2003  Hagiwara ............... H04L 69/28
                                                370/347
6,694,469 B1 *  2/2004  Jalali .................... H04L 1/1887
                                                714/748
(Continued)

FOREIGN PATENT DOCUMENTS

EP    1 003 303 A2     5/2000
EP    1003303 A2 *     5/2000   ............. H04B 7/212
(Continued)

OTHER PUBLICATIONS

Extended European Search Report dated Oct. 19, 2022, in corresponding European Patent Application No. 22173162.3, 10 pages.

*Primary Examiner* — Liang Che A Wang
(74) *Attorney, Agent, or Firm* — Oblon, McClelland, Maier & Neustadt, L.L.P.

(57) ABSTRACT

A base wireless device includes plural transmission buffers storing plural signals having transmission destinations that are different from each other, a transmission processing unit transmitting the signals to plural remote wireless devices respectively, by transmitting the signals stored in the plural transmission buffers in a predetermined order, regardless of whether or not each transmission has been made successfully, and a storage control unit, wherein when a transmission of a signal stored in one of the transmission buffers has been made successfully, the storage control unit overwrites the one transmission buffer from which the transmission has been made successfully, with another signal to be transmitted to a transmission destination that is different from a transmission destination of a signal stored in a transmission buffer other than the one transmission buffer from which the transmission has been made successfully, among the plural transmission buffers.

3 Claims, 5 Drawing Sheets

(51) Int. Cl.
  *H04W 76/15*  (2018.01)
  *H04L 47/10*  (2022.01)
  *H04W 28/02*  (2009.01)

(58) Field of Classification Search
  USPC ........................................ 709/207, 223, 224
  See application file for complete search history.

(56) References Cited

U.S. PATENT DOCUMENTS

| | | | | |
|---|---|---|---|---|
| 2003/0152083 | A1* | 8/2003 | Nagata | H04L 47/2441 |
| | | | | 370/335 |
| 2004/0098657 | A1* | 5/2004 | Jalali | H04L 1/1877 |
| | | | | 714/758 |
| 2009/0238110 | A1* | 9/2009 | Suzuki | H04L 47/12 |
| | | | | 370/328 |
| 2010/0165846 | A1* | 7/2010 | Yamaguchi | H04B 7/15592 |
| | | | | 370/236 |
| 2011/0306374 | A1* | 12/2011 | Hirai | G05B 19/4186 |
| | | | | 455/507 |
| 2013/0287008 | A1* | 10/2013 | Holma | H04B 7/2618 |
| | | | | 370/335 |
| 2017/0289959 | A1* | 10/2017 | Aki | H04W 72/0453 |

FOREIGN PATENT DOCUMENTS

| | | | | |
|---|---|---|---|---|
| EP | 2 854 321 | A1 | 4/2015 | |
| EP | 2854321 | A1 * | 4/2015 | ........... H04L 1/1692 |
| JP | 5497730 | B2 | 5/2014 | |
| JP | 2017-188868 | A | 10/2017 | |

* cited by examiner

BASE WIRELESS DEVICE AND WIRELESS COMMUNICATION METHOD

CROSS-REFERENCE TO RELATED APPLICATIONS

This application is based upon and claims the benefit of priority from Japanese Patent Application No. 2021-086143 filed on May 21, 2021, the contents of which are incorporated herein by reference.

BACKGROUND OF THE INVENTION

Field Of The Invention

The present invention relates to a base wireless device and a wireless communication method.

Description Of The Related Art

JP 5497730 B2 discloses an FA system in which a PC and a controller are connected via a field network. In JP 5497730 B2, transmission and reception of wireless messages are carried out.

SUMMARY OF THE INVENTION

However, in the conventional system, it is not always possible to realize rapid wireless communication.

The present invention has the object of solving the aforementioned problems.

A base wireless device according to an aspect of the present invention includes a base wireless device that carries out transmission and reception of signals to and from a plurality of remote wireless devices, including a plurality of transmission buffers configured to store a plurality of signals to be transmitted to the plurality of remote wireless devices, the plurality of signals having transmission destinations that are different from each other, a transmission processing unit configured to transmit the signals to the plurality of remote wireless devices respectively, by transmitting the signals stored in the plurality of transmission buffers in a predetermined order, regardless of whether or not each transmission has been made successfully, and a storage control unit, wherein when a transmission of a signal stored in one of the transmission buffers has been made successfully, the storage control unit is configured to overwrite the one transmission buffer from which the transmission has been made successfully, with another signal to be transmitted to a transmission destination that is different from a transmission destination of a signal stored in a transmission buffer other than the one transmission buffer from which the transmission has been made successfully, among the plurality of transmission buffers.

A wireless communication method according to another aspect of the present invention includes a method in which a base wireless device and a plurality of remote wireless devices carry out transmission and reception of signals to and from each other. The method includes storing, in a plurality of transmission buffers, a plurality of signals to be transmitted to the plurality of remote wireless devices, the plurality of signals having transmission destinations that are different from each other, transmitting the signals to the plurality of remote wireless devices respectively, by transmitting the signals stored in the plurality of transmission buffers in a predetermined order, regardless of whether or not each transmission has been made successfully, and overwriting, when a transmission of a signal stored in one of the transmission buffers has been made successfully, the one transmission buffer from which the transmission has been made successfully, with another signal to be transmitted to a transmission destination that is different from a transmission destination of a signal stored in a transmission buffer other than the one transmission buffer from which the transmission has been made successfully, among the plurality of transmission buffers.

According to the present invention, it is possible to provide a base wireless device and a wireless communication method that are capable of realizing rapid wireless communication.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Embodiment

Figure 1:
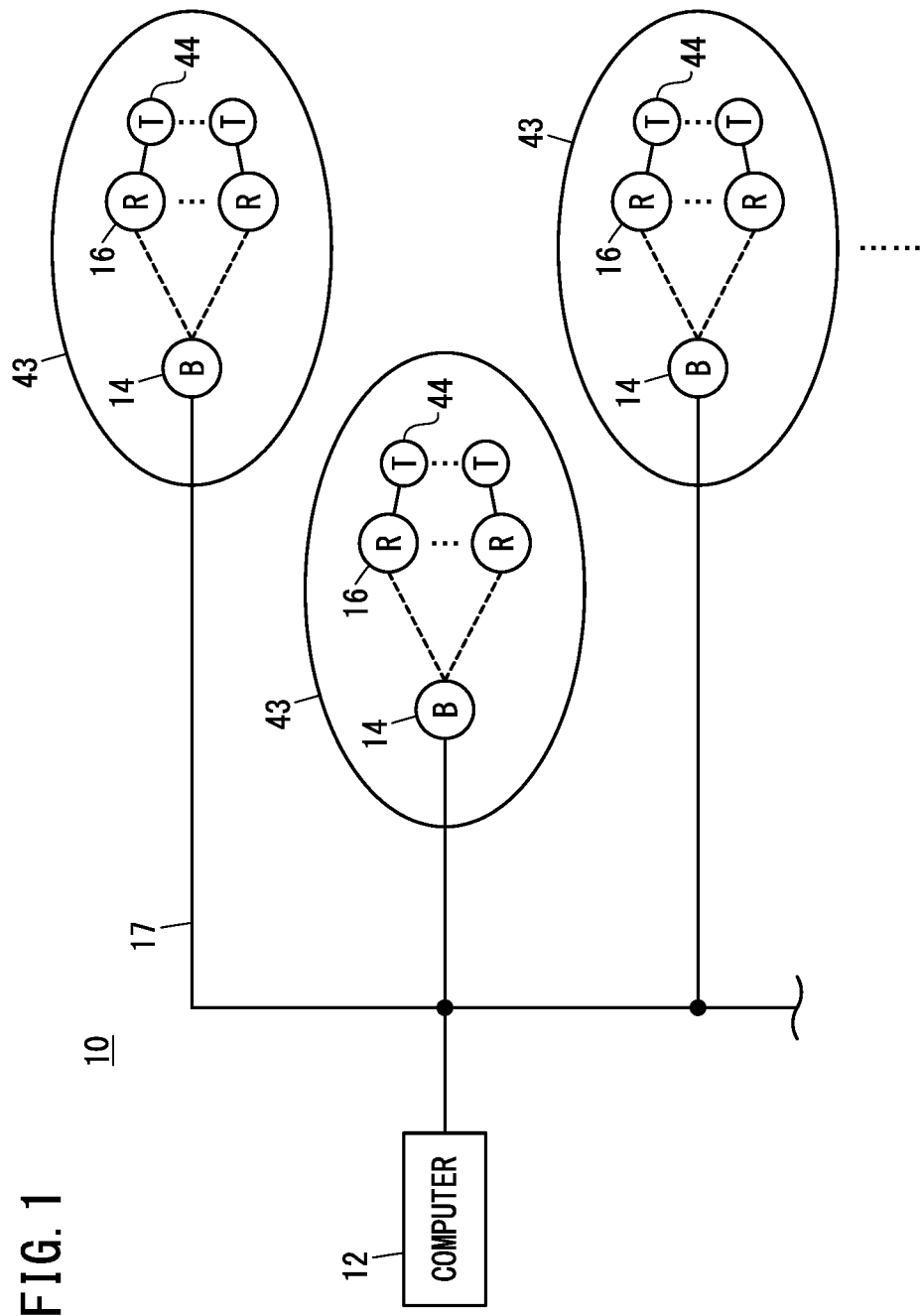
FIG. 1 is a diagram illustrating a wireless communication system according to an embodiment.
Figure 2:
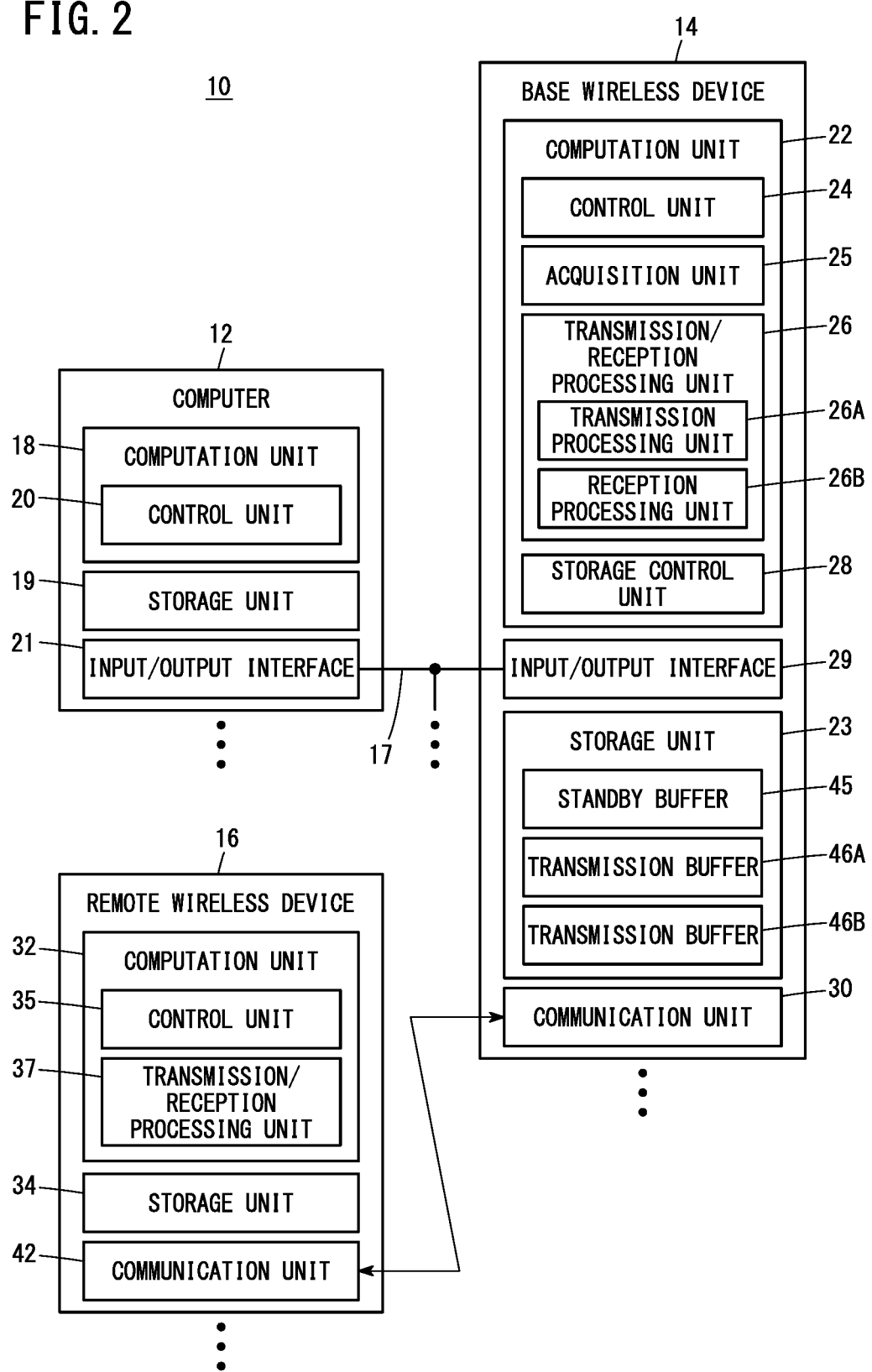
FIG. 2 is a block diagram illustrating a wireless communication system according to an embodiment.

A base wireless device and a wireless communication method according to an embodiment will be described below with reference to FIGS. 1 to 5. FIG. 1 is a diagram illustrating a wireless communication system according to the present embodiment. FIG. 2 is a block diagram illustrating the wireless communication system according to the present embodiment.

As shown in FIG. 1, a wireless communication system 10 according to the present embodiment may include a computer 12, a base wireless device 14, and a remote wireless device 16. The wireless communication system 10 may include a plurality of base wireless devices 14. The single computer 12 and the plurality of base wireless devices 14 may be connected via a fieldbus 17. Pairing may be performed in advance between the base wireless device 14 and the remote wireless device 16. A synchronous connection may be made between the paired base wireless device 14 and the remote wireless device 16. A plurality of remote wireless devices 16 can be synchronously connected to a single base wireless device 14. The base wireless device 14 may transmit signals to and receive signals from the plurality of remote wireless devices 16. A plurality of networks 43 may be configured by synchronously connecting the plurality of remote wireless devices 16 to each of the base wireless devices 14.

The computer 12 can monitor and control industrial equipment. As the computer 12, for example, a PLC (Programmable Logic Controller) may be used, but the computer 12 is not limited thereto. As illustrated in FIG. 2, the computer 12 may include, for example, a computation unit 18 and a storage unit 19.

The computation unit 18 may include, for example, a processor such as a CPU (Central Processing Unit). That is, the computation unit 18 may include processing circuitry. The computation unit 18 includes a control unit 20. Although components other than the control unit 20 may be included in the computation unit 18, the components other than the control unit 20 are omitted herein for the sake of simplicity of description. The control unit 20 governs the overall control of the computer 12. The control unit 20 may monitor and control industrial equipment. The control unit 20 may be realized by programs, which are stored in the storage unit 19, being executed by the computation unit 18. At least a part of the control unit 20 may be realized by an integrated circuit such as an ASIC (Application Specific Integrated Circuit) or an FPGA (Field-Programmable Gate Array). At least a part of the control unit 20 may be an electronic circuit including a discrete device.

The storage unit 19 may include a volatile memory (not illustrated) and a nonvolatile memory (not illustrated). Examples of the volatile memory may include, for example, a RAM (Random Access Memory) or the like. Examples of the nonvolatile memory may include, for example, a ROM (Read Only Memory), a flash memory, or the like. Data and the like may be stored, for example, in the volatile memory. Programs, tables, maps, and the like may be stored, for example, in the nonvolatile memory. At least a part of the storage unit 19 may be included in the above-described processor, integrated circuit, or the like. The storage unit 19 may further include an HDD (Hard Disk Drive), SSD (Solid State Drive), and the like.

The computer 12 is provided with an input/output interface 21 for realizing fieldbus connection. The computer 12 may communicate with the base wireless device 14 via the fieldbus 17.

The base wireless device 14 includes, for example, a computation unit 22 and a storage unit 23.

The computation unit 22 may include, for example, a processor such as a CPU. That is, the computation unit 22 may include a processing circuit. The computation unit 22 may include a control unit 24, an acquisition unit 25, a transmission/reception processing unit 26, and a storage control unit 28. The computation unit 22 may be equipped with other components apart from these components noted above. However, the components other than these components are omitted herein for the sake of simplicity. The control unit 24, the acquisition unit 25, the transmission/reception processing unit 26, and the storage control unit 28 may be realized by programs, which are stored in the storage unit 23, being executed by the computation unit 22. The control unit 24 governs the overall control of the base wireless device 14. At least a part of the control unit 24, the acquisition unit 25, the transmission/reception processing unit 26, and the storage control unit 28 may be realized by an integrated circuit such as an ASIC or an FPGA. At least a part of the control unit 24, the acquisition unit 25, the transmission/reception processing unit 26, and the storage control unit 28 may be an electronic circuit including a discrete device.

The storage unit 23 may include a volatile memory (not illustrated) and a nonvolatile memory (not illustrated). Examples of the volatile memory may include, for example, a RAM or the like. Examples of the non-volatile memory may include, for example, a ROM, a flash memory, or the like. Data and the like may be stored, for example, in the volatile memory. Programs, tables, maps, and the like may be stored, for example, in the nonvolatile memory. At least a part of the storage unit 23 may be included in the above-described processor, integrated circuit, or the like.

The base wireless device 14 is provided with an input/output interface 29 for realizing fieldbus connection. The base wireless device 14 may be connected to the computer 12 via the fieldbus 17 as described above.

The base wireless device 14 may be provided with a communication unit 30 for carrying out wireless communication. The base wireless device 14 may carry out wireless communication with the remote wireless device 16 using the communication unit 30.

The remote wireless device 16 may be provided in each of the plurality of devices 44 (see FIG. 1) included in the industrial equipment. As an example of the device 44, there may be cited a sensor, a valve, and the like, although the device 44 is not limited thereto. The remote wireless device 16 is provided with, for example, a computation unit 32 and a storage unit 34.

The computation unit 32 may include, for example, a processor such as a CPU. That is, the computation unit 32 may include a processing circuit. The computation unit 32 may include a control unit 35 and a transmission/reception processing unit 37. The computation unit 32 may be equipped with other components apart from these components noted above. However, the components other than these components are omitted herein for the sake of simplicity. The control unit 35 and the transmission/reception processing unit 37 may be realized by programs, which are stored in the storage unit 34, being executed by the computation unit 32. The control unit 35 governs the overall control of the remote wireless device 16. At least a part of the control unit 35 and the transmission/reception processing unit 37 may be realized by an integrated circuit such as an ASIC or an FPGA. At least a part of the control unit 35 and the transmission/reception processing unit 37 may be an electronic circuit including a discrete device.

The storage unit 34 may include a volatile memory (not illustrated) and a nonvolatile memory (not illustrated). Examples of the volatile memory may include, for example, a RAM or the like. Examples of the non-volatile memory may include, for example, a ROM, a flash memory, or the like. Data and the like may be stored, for example, in the volatile memory. Programs, tables, maps, and the like may be stored, for example, in the nonvolatile memory. At least a part of the storage unit 34 may be included in the above-described processor, integrated circuit, or the like.

The remote wireless device 16 is provided with a communication unit 42 for carrying out wireless communication. The remote wireless device 16 may carry out wireless communication with the base wireless device 14 using the communication unit 42.

As described above, the base wireless device 14 may include the transmission/reception processing unit 26. The transmission/reception processing unit 26 may include a transmission processing unit 26A and a reception processing unit 26B. The transmission processing unit 26A performs a signal transmission process. The reception processing unit 26B performs a signal reception process. As described above, the remote wireless device 16 may include the transmission/reception processing unit 37. The transmission/reception processing unit 26 and the transmission/reception processing unit 37 govern transmission/reception processes of signals between the remote wireless device 16 and the base wireless device 14. Communication by a frequency hopping method may be carried out between the base wireless device 14 and the remote wireless device 16 that are synchronously connected. That is, between the synchronously connected base wireless device 14 and remote wireless device 16, signal transmission and reception may be carried out by switching hopping frequencies at predetermined hopping periods Tfh(n) (see FIG. 5).

As described above, the base wireless device 14 may be provided with the acquisition unit 25. The acquisition unit 25 may sequentially acquire signals (data packets) supplied from the computer 12. The signal supplied from the computer 12 may include information indicating the remote wireless device 16 that is a transmission destination of the signal.

As described above, the base wireless device 14 may include the storage unit 23. The storage unit 23 may include a standby buffer 45. The acquisition unit 25 sequentially stores a plurality of signals supplied from the computer 12 in the standby buffer 45. The standby buffer 45 may store signals acquired by the acquisition unit 25 in chronological order.

The storage unit 23 may further include a plurality of transmission buffers 46A and 46B. The transmission buffers 46A and 46B may temporarily store signals to be transmitted to the remote wireless device 16. The reference numeral 46 will be used when describing the buffers in general, whereas the reference numerals 46A and 46B will be used when describing the individual buffers. The plurality of transmission buffers 46 may store a plurality of signals to be transmitted to the plurality of remote wireless devices 16. A plurality of signals having transmission destinations that are different from each other may be stored in the plurality of transmission buffers 46. That is, when a signal is stored in the transmission buffer 46B, a signal to be transmitted to a transmission destination different from the transmission destination of the signal stored in the transmission buffer 46B is stored in the transmission buffer 46A. When a signal is stored in the transmission buffer 46A, a signal to be transmitted to a transmission destination different from the transmission destination of the signal stored in the transmission buffer 46A is stored in the transmission buffer 46B.

The transmission processing unit 26A transmits the signals stored in the plurality of transmission buffers 46 in a predetermined order, regardless of whether or not each transmission has been made successfully. The transmission processing unit 26A transmits the signals stored in the plurality of transmission buffers 46 in a predetermined order, so as to transmit the signals to each of the plurality of remote wireless devices 16.

When the remote wireless device 16 receives the signal from the base wireless device 14, the remote wireless device 16 transmits to the base wireless device 14 a reception completion notification indicating that the signal has been received. Transmission of a signal from the base wireless device 14 to the remote wireless device 16 and transmission of a reception completion notification from the remote wireless device 16 to the base wireless device 14 are carried out within one hopping period. When the reception processing unit 26B receives the reception completion notification within the hopping period in which the signal is transmitted from the base wireless device 14 to the remote wireless device 16, the control unit 24 determines that the transmission of the signal to the remote wireless device 16 has been made successfully. When the reception processing unit 26B does not receive the reception completion notification within the hopping period in which the signal is transmitted from the base wireless device 14 to the remote wireless device 16, the control unit 24 determines that the transmission of the signal to the remote wireless device 16 has failed.

As described above, the base wireless device 14 may include the storage control unit 28. The storage control unit 28 stores a signal that is transmitted to a remote wireless device 16 in the transmission buffer 46. The storage control part 28 stores a plurality of signals having transmission destinations that are different from each other in the plurality of transmission buffers 46. When the transmission of the signal stored in the transmission buffer 46 has been made successfully, the storage control unit 28 performs the following process. That is, in this case, the storage control unit 28 overwrites the transmission buffer 46 from which transmission has been made successfully, with a signal to be transmitted to a transmission destination different from a transmission destination of a signal stored in a transmission buffer 46 other than the transmission buffer 46 from which transmission has been made successfully, among the plurality of transmission buffers 46. For example, when the transmission of the signal stored in the transmission buffer 46A has been made successfully, the storage control unit 28 performs the following control. That is, in this case, the storage control unit 28 overwrites the transmission buffer 46A, with a signal to be transmitted to a transmission destination that is different from a transmission destination of the signal stored in the transmission buffer 46B other than the transmission buffer 46A, among the plurality of transmission buffers 46. When the transmission of the signal stored in the transmission buffer 46B has been made successfully, the storage control unit 28 performs the following control. That is, in this case, the storage control unit 28 overwrites the transmission buffer 46B, with a signal to be transmitted to a transmission destination that is different from a transmission destination of the signal stored in the transmission buffer 46A other than the transmission buffer 46B, among the plurality of transmission buffers 46.

The storage control unit 28 stores, in the transmission buffers 46, signals selected from the signals stored in the standby buffer 45 in accordance with priority. For example, the earlier the time at which the signal was acquired, the higher the priority may be. That is, the priority of a signal acquired earlier by the acquisition unit 25 (acquisition time is old) may be higher than the priority of a signal acquired later by the acquisition unit 25 (acquisition time is new).

Figure 3:
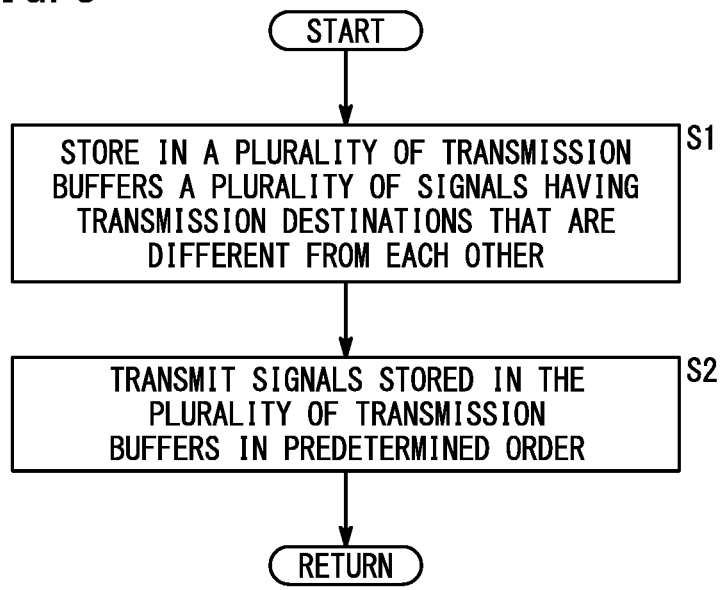
FIG. 3 is a flowchart illustrating an example of operation of a base wireless device according to an embodiment.

The operation of the base wireless device 14 according to the present embodiment will be described below with reference to FIG. 3. FIG. 3 is a flowchart illustrating an example of operation of the base wireless device according to the present embodiment. The basic operation of transmitting a signal is illustrated in FIG. 3.

In step S1, the storage control unit 28 provided in the base wireless device 14 stores in the plurality of transmission buffers 46 a plurality of signals having transmission destinations that are different from each other.

In step S2, the transmission processing unit 26A provided in the base wireless device 14 transmits the signals stored in the plurality of transmission buffers 46 in a predetermined order. The process shown in FIG. 3 may be performed repeatedly.

Figure 4:
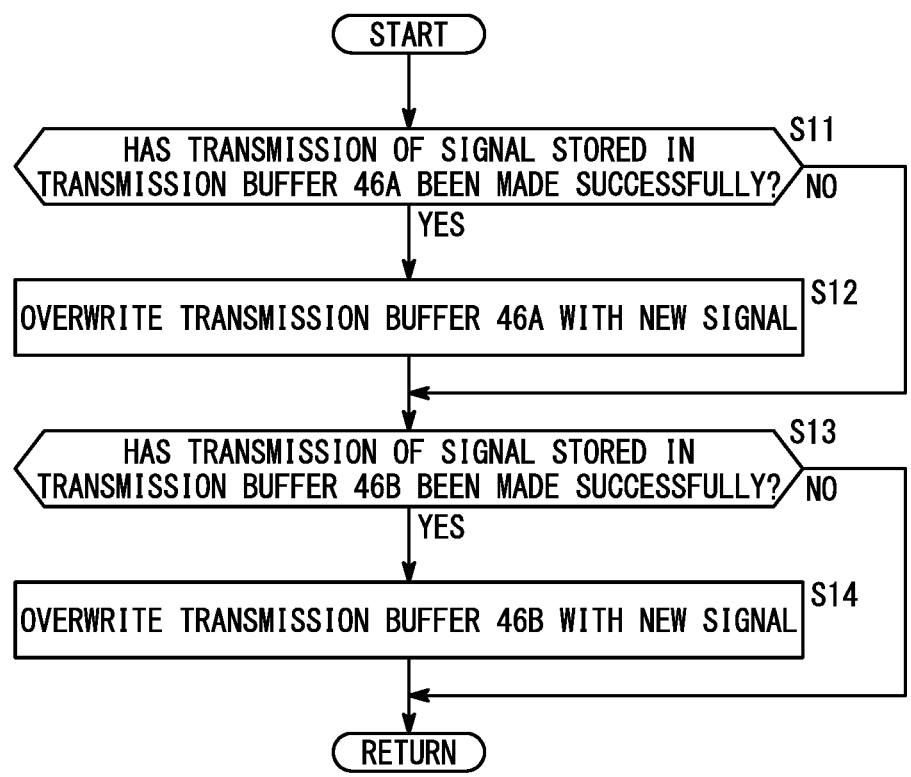
FIG. 4 is a flowchart illustrating an example of operation of a base wireless device according to an embodiment.

The operation of the base wireless device 14 according to the present embodiment will be described below with reference to FIG. 4. FIG. 4 is a flowchart illustrating an example of operation of the base wireless device according to the present embodiment. FIG. 4 shows an example of the operation corresponding to the success or failure of the transmission of the signals stored in the transmission buffers 46.

In step S11, the control unit 24 determines whether or not the transmission of the signal stored in the transmission buffer 46A has been made successfully. If the transmission of the signal stored in the transmission buffer 46A has been made successfully (YES in step S11), the process proceeds to step S12. If the transmission of the signal stored in the transmission buffer 46A has failed (NO in step S11), the process proceeds to step S13.

In step S12, the storage control unit 28 overwrites the transmission buffer 46A with a new signal. That is, the storage control unit 28 overwrites the transmission buffer 46A with a signal to be transmitted to a transmission destination that is different from the transmission destination of the signal stored in the transmission buffer 46B. When step S12 is completed, the process proceeds to step S13.

In step S13, the control unit 24 determines whether or not the transmission of the signal stored in the transmission buffer 46B has been made successfully. If the transmission of the signal stored in the transmission buffer 46B has been made successfully (YES in step S13), the process proceeds to step S14. When the transmission of the signal stored in the transmission buffer 46B has failed (NO in step S13), the process illustrated in FIG. 4 is completed.

In step S14, the storage control unit 28 overwrites the transmission buffer 46B with a new signal. That is, the storage control unit 28 overwrites the transmission buffer 46B with a signal to be transmitted to a transmission destination that is different from the transmission destination of the signal stored in the transmission buffer 46A. When step S14 is completed, the process shown in FIG. 4 is completed. The process shown in FIG. 4 may be performed repeatedly.

Figure 5:
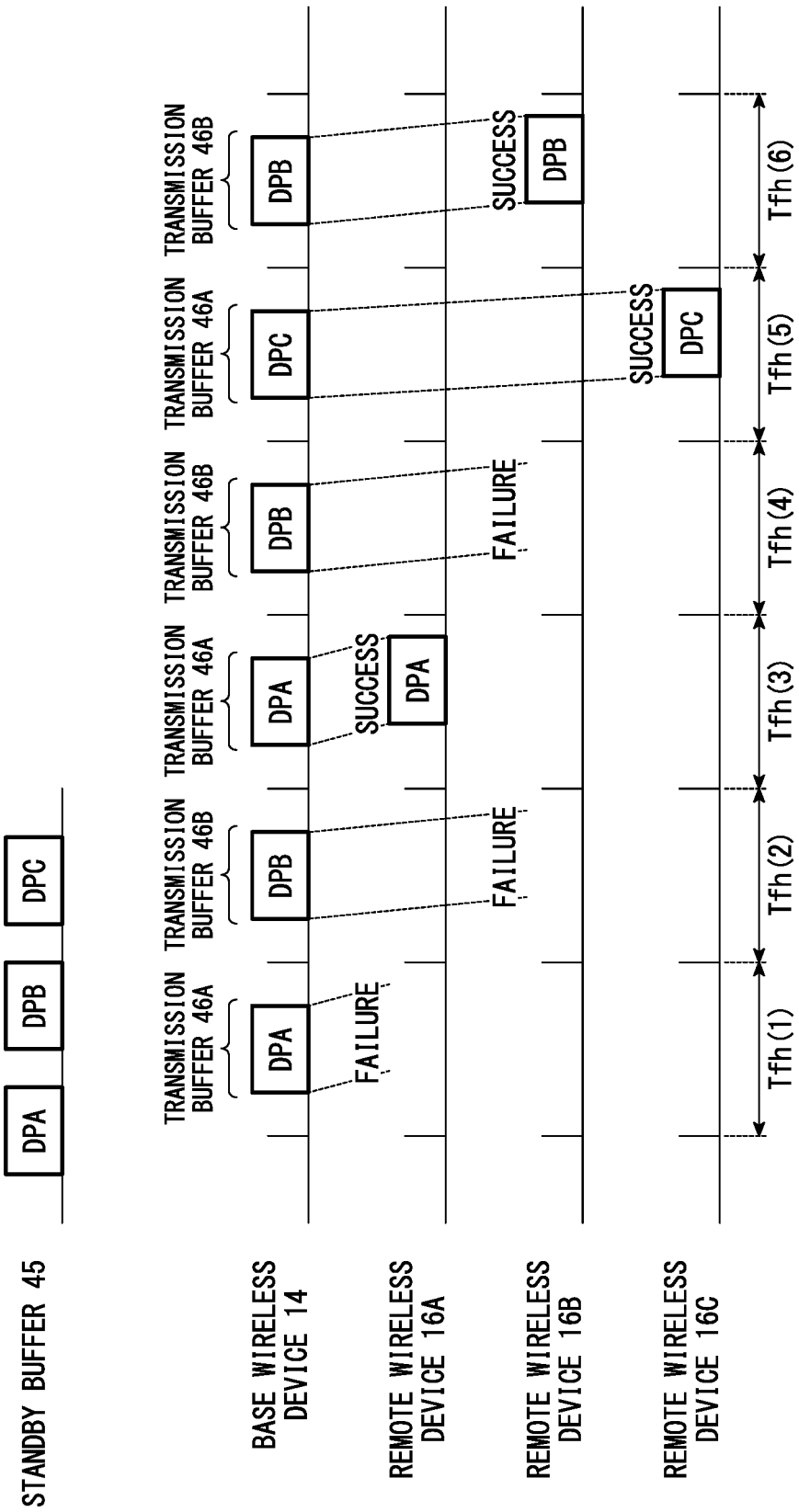
FIG. 5 is a time chart illustrating an example of operation of the base wireless device according to an embodiment.

The operation of the base wireless device 14 according to the present embodiment will be described below with reference to FIG. 5. FIG. 5 is a time chart illustrating an example of operation of the base wireless device according to the present embodiment.

FIG. 5 shows an example in which signals (data packets) DPA to DPC are stored in the standby buffer 45. The signal DPA is a signal to be transmitted to a remote wireless device 16A among the plurality of remote wireless devices 16. The signal DPB is a signal to be transmitted to a remote wireless device 16B among the plurality of remote wireless devices 16. The signal DPC is a signal to be transmitted to a remote wireless device 16C among the plurality of remote wireless devices 16. The symbol DP will be used when describing the signals in general, and the symbols DPA to DPC will be used when describing the individual signals.

The transmission buffer 46 stores a signal selected from the signals stored in the standby buffer 45 in accordance with priority. The time at which the signal DPA was acquired by the acquisition unit 25 is earlier than the time at which the signal DPB was acquired by the acquisition unit 25. The time at which the signal DPB was acquired by the acquisition unit 25 is earlier than the time at which the signal DPC was acquired by the acquisition unit 25. Therefore, the priority of the signal DPA is higher than that of the signal DPB. Further, the priority of the signal DPB is higher than the priority of the signal DPC. Therefore, the storage control unit 28 stores the signal DPA in the transmission buffer 46A. The storage control unit 28 also stores the signal DPB in the transmission buffer 46B. Since the number of transmission buffers 46 is two, the number of signals that can be simultaneously stored in a plurality of transmission buffers 46 is two. Therefore, the signal DPC is not stored in any of the transmission buffers 46 at this stage.

The signals DP stored in the plurality of transmission buffers 46 are transmitted in a predetermined order. In a hopping period Tfh(1), the signal DPA stored in the transmission buffer 46A is transmitted. Specifically, the signal DPA is transmitted from the base wireless device 14 to the remote wireless device 16A. FIG. 5 shows an example in which the transmission of the signal DPA fails in the hopping period Tfh(1).

In a hopping period Tfh(2) subsequent to the hopping period Tfh(1), the signal DPB stored in the transmission buffer 46B is transmitted. Specifically, the signal DPB is transmitted from the base wireless device 14 to the remote wireless device 16B. FIG. 5 shows an example in which the transmission of the signal DPB fails in the hopping period Tfh(2).

In a hopping period Tfh(3) subsequent to the hopping period Tfh(2), the signal DPA stored in the transmission buffer 46A is transmitted. Specifically, the signal DPA is transmitted from the base wireless device 14 to the remote wireless device 16A. FIG. 5 shows an example in which the transmission of the signal DPA has been made successfully in the hopping period Tfh(3). When the transmission of the signal DPA stored in the transmission buffer 46A has been made successfully, the transmission buffer 46A is overwritten with the signal DPC.

In a hopping period Tfh(4) subsequent to the hopping period Tfh(3), the signal DPB stored in the transmission buffer 46B is transmitted. Specifically, the signal DPB is transmitted from the base wireless device 14 to the remote wireless device 16B. FIG. 5 shows an example in which the transmission of the signal DPB fails in the hopping period Tfh(4).

In a hopping period Tfh(5) subsequent to the hopping period Tfh(4), the signal DPC stored in the transmission buffer 46A is transmitted. Specifically, the signal DPC is transmitted from the base wireless device 14 to the remote wireless device 16C. FIG. 5 shows an example in which the transmission of the signal DPC has been made successfully in the hopping period Tfh(5).

In a hopping period Tfh(6) subsequent to the hopping period Tfh(5), the signal DPB stored in the transmission buffer 46B is transmitted. Specifically, the signal DPB is transmitted from the base wireless device 14 to the remote wireless device 16B. FIG. 5 shows an example in which the transmission of the signal DPB has been made successfully in the hopping period Tfh(6). In this way, the transmission of the signals DP may be carried out sequentially.

If the number of transmission buffers 46 is only one, the signal DPC cannot be transmitted until after the transmission of the signal DPB has been made successfully or until after the number of retries of the transmission of the signal DPB reaches a predetermined number. In contrast, since the plurality of transmission buffers 46 are provided in the present embodiment, even if transmission of the signal DPB has failed, the signal DPC may be transmitted. Therefore, as illustrated in FIG. 5, the signal DPC may be successfully transmitted before the signal DPB is successfully transmitted. As described above, according to the present embodiment, rapid wireless communication can be realized.

Modified Embodiment

The present invention is not limited to the above-described embodiments, and various configurations can be adopted therein without departing from the essence and gist of the present invention.

For example, in the above-described embodiment, although an exemplary case has been described in which the number of transmission buffers 46 is two, the present invention is not necessarily limited to this feature. The number of transmission buffers 46 may be three or more.

The above-described embodiments can be summarized in the following manner.

The base wireless device (14) carries out transmission and reception of signals to and from the plurality of remote wireless devices (16), and includes the plurality of transmission buffers (46A, 46B) configured to store a plurality of signals to be transmitted to the plurality of remote wireless devices, the plurality of signals having transmission destinations that are different from each other, the transmission processing unit (26A) configured to transmit the signals to the plurality of remote wireless devices respectively, by transmitting the signals stored in the plurality of transmission buffers in a predetermined order, regardless of whether or not each transmission has been made successfully, and the storage control unit (28), wherein when the transmission of the signal (DPA) stored in one of the transmission buffers (46A) has been made successfully, the storage control unit is configured to overwrite the one transmission buffer (46A) from which the transmission has been made successfully, with other signal (DPC) to be transmitted to the transmission destination (16C) that is different from the transmission destination (16B) of the signal (DPB) stored in the transmission buffer (46B) other than the one transmission buffer (46A) from which the transmission has been made successfully, among the plurality of transmission buffers. If the number of transmission buffers is only one, another signal cannot be transmitted until after the transmission of one signal has been made successfully or until after the number of retries of the transmission of the signal DPB has reached a predetermined number. On the other hand, in the configuration of the present invention, since a plurality of transmission buffers are provided, even when transmission of one signal has failed, transmission of another signal can be carried out. Therefore, before one signal is successfully transmitted, another signal can be transmitted successfully. According to such a configuration, rapid wireless communication can be realized.

The base wireless device further includes the standby buffer (45) configured to store a plurality of signals supplied from the computer (12) connected by the fieldbus (17), wherein the storage control unit stores, in the transmission buffers, signals selected from the signals stored in the standby buffer in accordance with priority. According to such a configuration, signal transmission can be accurately carried out.

The wireless communication method in which the base wireless device and the plurality of remote wireless devices carry out transmission and reception of signals to and from each other, is provided. The method includes storing (S1), in the plurality of transmission buffers, a plurality of signals to be transmitted to the plurality of remote wireless devices, the plurality of signals having transmission destinations that are different from each other, transmitting (S2) the signals to the plurality of remote wireless devices respectively, by transmitting the signals stored in the plurality of transmission buffers in a predetermined order, regardless of whether or not each transmission has been made successfully, and overwriting (S11 to S14), when a transmission of a signal stored in one of the transmission buffers has been made successfully, the one transmission buffer from which the transmission has been made successfully, with another signal to be transmitted to a transmission destination that is different from a transmission destination of a signal stored in a transmission buffer other than the one transmission buffer from which the transmission has been made successfully, among the plurality of transmission buffers.

What is claimed is:

1. A base wireless device that carries out transmission and reception of signals to and from a plurality of remote wireless devices, comprising:
   a plurality of transmission buffers configured to store a plurality of signals to be transmitted to the plurality of remote wireless devices, the plurality of signals having transmission destinations that are different from each other, wherein each of the plurality of transmission buffers is nonexclusive for each of the transmission destinations and is capable of storing, one after another, different signals to be transmitted to different transmission destinations, and wherein the plurality of transmission buffers are physically distinct from each other;
   a transmission processing unit configured to transmit the signals to the plurality of remote wireless devices respectively, by transmitting the signals stored in the plurality of transmission buffers in a predetermined order, regardless of whether or not each transmission has been made successfully; and
   a storage control unit, wherein when a transmission of a signal stored in one of the transmission buffers has been made successfully, the storage control unit is configured to overwrite the one transmission buffer from which the transmission has been made successfully, with another signal to be transmitted to a transmission destination that is different from a transmission destination of a signal stored in a transmission buffer other than the one transmission buffer from which the transmission has been made successfully, among the plurality of transmission buffers.

2. The base wireless device according to claim 1, further comprising a standby buffer configured to store a plurality of signals supplied from a computer connected by a fieldbus,
   wherein the storage control unit stores, in the transmission buffers, signals selected from the signals stored in the standby buffer in accordance with priority.

3. A wireless communication method in which a base wireless device and a plurality of remote wireless devices carry out transmission and reception of signals to and from each other, the method comprising:
   storing, in a plurality of transmission buffers, a plurality of signals to be transmitted to the plurality of remote wireless devices, the plurality of signals having transmission destinations that are different from each other, wherein each of the plurality of transmission buffers is nonexclusive for each of the transmission destinations and is capable of storing, one after another, different signals to be transmitted to different transmission destinations, and
   wherein the plurality of transmission buffers are physically distinct from each other:
      transmitting the signals to the plurality of remote wireless devices respectively, by transmitting the signals stored in the plurality of transmission buffers in a predetermined order, regardless of whether or not each transmission has been made successfully; and
      overwriting, when a transmission of a signal stored in one of the transmission buffers has been made successfully, the one transmission buffer from which the transmission has been made successfully, with another signal to be transmitted to a transmission destination that is different from a transmission destination of a signal stored in a transmission buffer other than the one transmission buffer from which the transmission has been made successfully, among the plurality of transmission buffers.

\* \* \* \* \*